UNITED STATES PATENT OFFICE.

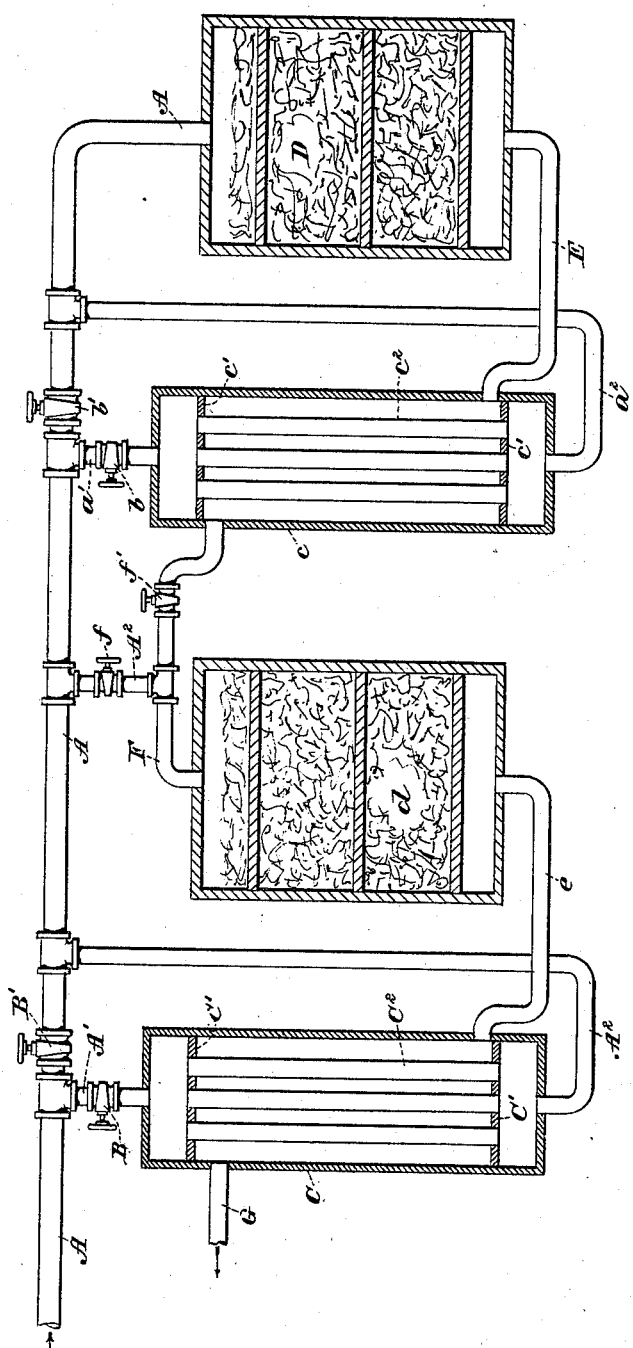

JOHN B. FRANCIS HERRESHOFF, OF BROOKLYN, NEW YORK.

METHOD OF MAKING SULFURIC ANHYDRID.

SPECIFICATION forming part of Letters Patent No. 719,332, dated January 27, 1903.

Application filed January 10, 1902. Serial No. 89,095. (No specimens.)

*To all whom it may concern:*

Be it known that I, JOHN BROWN FRANCIS HERRESHOFF, a citizen of the United States, and a resident of the borough of Brooklyn, county of Kings, and State of New York, have invented certain new and useful Improvements in the Manufacture of Sulfuric Anhydrid, of which the following is a specification.

My invention relates to the manufacture of sulfuric anhydrid according to the so-called "contact" process, in which a mixture of air and sulfurous-acid gas is caused to come in contact with catalytic substances, such as finely-divided platinum or equivalent bodies. Heretofore it has been proposed to effect the complete conversion of the sulfurous-acid and air mixture into sulfuric anhydrid in a single operation. I have found that this is liable in practice to lead to a dissociation of the produced anhydrid or a part thereof into the original constituents—sulfurous acid and air. To overcome this defect, I proceed by successive stages and employ at least two contact-chambers, through which the gas is caused to pass in succession. In its path from one contact-chamber to the other the gas is caused to traverse a heat-exchange apparatus or cooler in which the heated gas gives off part of its heat to the incoming gas which is on its way to the first contact-chamber. A similar heat-exchange apparatus is connected with the outlet to the last contact-chamber, and this apparatus is connected in series, as it were, with the other cooler, so that the arriving cool gas mixture may be subjected to two or more successive heatings. It will be understood that in the first contact-chamber there will occur only a partial conversion of the mixture into sulfuric anhydrid. Too intense a heat will then be avoided, thereby protecting the apparatus against rapid wear. Furthermore, I avoid all danger of the temperature's rising so high as to impair the efficiency of the reaction or cause a dissociation of the sulfuric anhydrid produced. Assuming the incoming gases to have a temperature of about 600° Fahrenheit, the conversion of the entire mixture into $SO_3$ at one time in one contact-chamber would produce a temperature of at least 1,050° in said chamber. As it is found in practice that the useful reaction ceases at about 900° it will be obvious that the temperature obtained when proceeding according to the usual method is detrimentally high. With my new process, however, in which a partial conversion is effected at first, the heat produced is much lower and is kept under that temperature, which impairs the efficiency of the reaction and injures the material of the receptacle or chamber containing the contact substance.

The invention may be carried out by means of any suitable apparatus, an example of which is shown in the accompanying drawing, which is an elevation of a portion of a sulfuric-acid plant with parts in section.

A indicates the supply-pipe through which the mixture of sulfurous-acid gas $(SO_2)$ and air is conveyed to the apparatus. This pipe has a connection A', containing a valve B and leading to a heat-exchange apparatus C of any suitable construction. For instance, as shown, this apparatus may comprise a casing with partitions C' connected by tubes $C^2$, through which the mixture admitted from the connection A' passes from one end of the casing to the other. The chamber between the partitions C' is adapted to receive a gaseous medium, as will be described presently, the heat of which will be partly absorbed by the comparatively cool mixture flowing through the tubes $C^2$. At the discharge end of the casing C is located a pipe connection $A^2$, which leads to a point of the pipe A in advance of the point at which the connection A' branches off. A valve B' is located in the pipe A between the points at which the pipes A' $A^2$ are connected with it. At a farther point of the supply-pipe A, I arrange a connection $a'$, leading to a heat-exchange apparatus $c$, having partitions $c'$ and connecting-tubes $c^2$. From this heat-exchange apparatus or casing $c$ a pipe $a^2$ leads back to the supply-pipe A, and valves $b$ $b'$ are provided in the same relative positions as the valves B B'. The extremity of the supply-pipe A is connected with a contact-chamber D, of substantially the usual construction, except that, as previously mentioned, the contact substance may increase gradually from the inlet toward the outlet.

E is a pipe leading from the outlet of the contact-chamber D to the chamber between the partitions $c'$ of the heat-exchange apparatus c. A connecting-pipe F leads from the said chamber to the inlet of another contact-chamber d, which may be of the same construction as the contact-chamber D. The discharge-pipe e of this contact-chamber d leads to the central chamber of the heat-exchange apparatus C, from which extends the delivery-pipe G.

It will be understood that by the use of the valves B B' b b' the path of the mixture of sulfurous-acid gas and air may be varied. I may, for instance, close the valves B' b' and open the valves B b. In this case the sulfurous-acid-gas mixture will pass from the pipe A to the connection A' to the heat-exchange apparatus C, through the pipes $C^2$ thereof out through the pipe $A^2$, then through the central portion of the pipe A, thereupon through the second heat-exchange apparatus c, the pipe $a^2$, and the end of the pipe A to the contact-chamber D. In this chamber the sulfurous-acid gas and air mixture will by the well-known action of a contact substance, such as platinum, become partly converted into sulfuric anhydrid. When, as previously stated, the richness of the contact substance is gradually increased from the inlet toward the outlet, the reaction will progress quite gradually and an extreme heat, such as might cause a decomposition or dissociation of a large proportion of the sulfuric anhydrid formed, is avoided. It will be understood that the product leaving the first contact-chamber D is not a final product, but still contains a certain proportion of unconverted sulfurous-acid gas. This hot mixture passes through the central chamber of the heat-exchange apparatus c, and then to the second contact-chamber d, in which the same reaction takes place, so that the conversion of the sulfurous-acid gas into sulfuric anhydrid is completed or at least brought nearer completion. It will be understood that the gaseous mixture leaving the first contact-chamber is of a high temperature, and, in fact, in many cases the temperature is so high that it would be injurious to at once subject these gases to a repetition of the contact process. It will, however, be obvious that in their passage through the heat-exchange apparatus c the gases are cooled and give off part of their heat to the mixture flowing through the pipes $c^2$ on its way to the first contact-chamber D. Thus the partly-converted mixture is brought down to the temperature which is best for a successful continuation of the process, while the gases which are on their way to the first contact-chamber are heated, so that they will enter such chamber in a proper condition for starting the contact process. The mixture, converted completely or only partially, which leaves the contact-chamber d through the pipe e, passes through the central chamber of the heat-exchange apparatus C, where it gives off part of its heat to the cool incoming mixture which passes through the pipes $C^2$. Finally the cooled gas, consisting entirely or chiefly of sulfuric anhydrid, passes out through the pipe G to a gas-holder or other suitable apparatus, and if the conversion is not complete the gas may be passed through a third contact-chamber, and the operation may thus be repeated until a satisfactory final product is obtained. It will therefore be understood that in the construction shown the mixture of sulfurous-acid gas and air is heated twice before it gets to the first contact-chamber D and that this heating is effected by the absorption of heat from the gases leaving the contact-chambers D and d. In some cases the temperature of the initial mixture might by double heating be raised too high for the proper starting of the contact process. To obviate this, the valve B' may be opened slightly, so that a portion of the initial mixture will pass directly without any further heating to the casing c. By opening the valve B' more or less the relative proportion of the mixture flowing directly to the casing c and that passing through the heat-exchanging apparatus C may be varied, and this may be supplemented by also adjusting the valve B. If this is not sufficient, the valve B may be closed entirely, so that the entire body of the initial mixture will be heated only once—namely, in the heat-exchange apparatus c. In any event it will be understood that when the valve B' is opened a portion of the initial mixture will pass only through one heat-exchange apparatus. A further reduction of the heating effect upon the incoming gas mixture may be obtained by opening the valve b' and also, if desired, partially closing the valve b. In this case a portion of the initial mixture will flow directly to the contact-chamber D without being heated at all, another portion of this mixture will pass only through one of the heat-exchange apparatuses, and the remainder will pass through both of said apparatuses. By arranging thermometers at suitable points of the supply-pipe A the attendant will be enabled to quickly ascertain the effect of the regulation of the valves B B' b b', so that exactly the desired temperature may be obtained. The gas mixture which is admitted through the supply-pipe A may be comparatively cool or may have been subjected to a preliminary heating.

It will be observed that the incoming gas mixture is subjected to a plurality of heating operations, and is thus enabled to more readily take up the required amount of heat. The excess of heat contained in the products of the first reaction is, as described, utilized for heating the incoming mixture, and at the same time the partially-converted mixture is cooled to the proper temperature for the beginning or rather continuation of the reaction.

My improved process permits of a rapid production of sulfuric anhydrid and is of a very high efficiency—that is, a very high proportion of $SO_2$ is converted into $SO_3$. At the same time the heat is kept within relatively moderate limits, and I thus effect a great saving in the maintenance of the apparatus. By conducting the reaction in successive partial steps I am enabled to much better control the heat, so as not to exceed a temperature at which dissociation injuriously affects the result. The use of a plurality of contact-chambers and heat-exchange apparatuses further enables me to secure a better exchange and utilization of the heat, and, moreover, is of advantage in cases where it is desired to temporarily put one or the other of the contact-chambers out of action for repairing or other purposes. This is especially the case when more than two contact-chambers are employed. To enable one of the contact-chambers to be cut out, I provide suitable connections—such as, for instance, a pipe $A^2$, leading from the supply-pipe A to the conveying-pipe F—and I provide valves $f f'$, one in the connection $A^2$ and the other in the pipe F between the connection $A^2$ and the heat-exchange apparatus $c$. By closing the valves $b' f'$ and opening the valve $f$ the gas mixture may be caused to pass from the supply-pipe $a$ directly to the second contact-chamber $d$, so that repairs may be made to the first contact-chamber D or to the heat-exchange apparatus $c$ without disturbing the operation.

I claim as my invention and desire to secure by Letters Patent—

1. The process of making sulfuric anhydrid which consists in subjecting a stream of sulfurous-acid gas mixed with air in its entirety to the following successive operations: first, heating the entire body or stream; second, bringing the entire body or stream, previously heated, into contact with sufficient catalytic material to effect only a partial conversion of the mixture into sulfuric anhydrid; third, bringing the entire partially-converted body or stream out of reactive relation to the catalytic material, so as to discontinue the conversion, and cooling the entire partially-converted mixture during this period of discontinuance; and, fourth, bringing the cooled, partially-converted mixture in its original volume or amount into renewed reactive relation to catalytic material, to continue the reaction and transformation into sulfuric anhydrid.

2. The process of making sulfuric anhydrid which consists in partially converting a mixture of sulfurous-acid gas and air into sulfuric anhydrid by contact with catalytic material, discontinuing this contact action, cooling the partially-converted mixture in its original volume or amount during this period of discontinuance by bringing it in proximity to the cool unconverted mixture which is on its way to the catalytic material, and in this manner also heating the unconverted mixture, and then bringing the cooled partially-converted mixture, equal in amount or volume to that body which was subjected to the said partial conversion, into renewed reactive relation to catalytic material, to continue the reaction and transformation into sulfuric anhydrid.

JOHN B. FRANCIS HERRESHOFF.

Witnesses:
JOHN LOTKA,
EUGENE EBLE.